(12) United States Patent
Tsai

(10) Patent No.: US 7,000,738 B1
(45) Date of Patent: Feb. 21, 2006

(54) U-TYPE HANDBRAKE ASSEMBLY STRUCTURE

(75) Inventor: Szu-Fang Tsai, Chang-Hua Hsien (TW)

(73) Assignee: Tektro Technology Corporation, Chang Hua Hsien (TW)

( * ) Notice: Subject to any disclaimer, the term of this patent is extended or adjusted under 35 U.S.C. 154(b) by 0 days.

(21) Appl. No.: 11/058,181

(22) Filed: Feb. 16, 2005

(51) Int. Cl.
*B62L 1/06* (2006.01)

(52) U.S. Cl. .................... 188/24.19; 188/24.12

(58) Field of Classification Search ............ 188/24.11, 188/24.12, 24.19, 24.22, 73.31
See application file for complete search history.

(56) References Cited

U.S. PATENT DOCUMENTS

| | | | | |
|---|---|---|---|---|
| 5,152,377 A | * | 10/1992 | Yoshigai ................. | 188/24.11 |
| 5,740,889 A | * | 4/1998 | Tsai ......................... | 188/24.19 |
| 5,788,020 A | * | 8/1998 | Tseng ...................... | 188/24.12 |
| 6,173,818 B1 | * | 1/2001 | Kuo ......................... | 188/24.19 |
| 6,776,267 B1 | * | 8/2004 | Tsai ......................... | 188/24.19 |
| 6,877,588 B1 | * | 4/2005 | Tsai ......................... | 188/24.22 |

* cited by examiner

*Primary Examiner*—Melody M. Burch
(74) *Attorney, Agent, or Firm*—Leong C. Lei

(57) ABSTRACT

A U-type bicycle handbrake assembly structure is provided so that the brake arms could be quickly and easily positioned. The invention cuts a planar surface on the fitting tube welded to the bicycle frame. The planar surface is parallel to the brake pad's contact surface to the wheel rim. The invention then configures a protruding plate on the adjusting seat along the adjusting seat's axial direction. When a brake arm is pin-joined to the fitting tube of the bicycle frame, the brake arm could be positioned quickly and easily by arranging the axial protruding plate of the adjusting seat to match against the planar surface of the fitting tube.

1 Claim, 6 Drawing Sheets

U-TYPE HANDBRAKE ASSEMBLY STRUCTURE

BACKGROUND OF THE INVENTION (a) Technical Field of the Invention

The present invention generally relates to bicycle handbrakes, and more specifically to a U-type bicycle handbrake assembly structure.

(b) Description of the Prior Art

The bicycle handbrake is the key to the rider's safety. To brake the bicycle quickly, the brake arms of the handbrake has to be correctly hinged to the bicycle frame. The brake pads at the bottom of the brake arms should be disposed at either side of the wheel and should have an equal distance to the wheel rim, so that the brake pads could by pulled horizontally and symmetrically into engagement with wheel rim to slow or stop the bicycle.

Conventionally a U-type handbrake has its two brake arms hinged to the bicycle frame respectively and crossed with each other in an "X" configuration. Then a brake wire is connected to the upper ends of both brake arms so that, when the brake wire is pulled, the two brake pads on the other ends of the brake arms clips the wheel rim simultaneously.

FIG. 6 is an explosion perspective view of a brake arm of a conventional U-type handbrake. As illustrated, the brake arm 4 has a brake pad 41 at the bottom. During assembly, the brake arm 4 is pin-joined to the bicycle frame by screwing a bolt 43 through the brake arm 4 into a bolt hole 421 of the fitting tube 42 on the bicycle frame. Between the bolt 43 and the brake arm 4, there is a spring protection seat 45 containing a return spring 44 inside which is sleeved over by an adjusting seat 46. An end of the return spring 44 passes through the spring protection seat 45 and into a hole 40 on the brake arm 4. The other end of the return spring 44 is positioned against the inner side of the adjusting seat 46. To adjust the position of the brake arm 4, the bolt 43 is screwed loosed first. Then a tool is used to clamp the surface 461 and rotate the adjusting seat 44 so that the spring 44 could move the brake arm 4. However, to position a brake arm in its final place, a user constantly has to use one tool to tighten and loose the bolt 43 for many times. In the mean time, the user has to use another tool to clamp the surface 461 of the adjusting seat 46, and frequently the user has to grip a handbrake operating device on the handlebar to test if the brake arms are in the appropriate positions. More over, as the return spring 44 tends to resist the adjustment, if the bolt 43 is screwed in time to fix the adjusting seat 46, the return spring 44 would void all the adjustment arranged so far.

SUMMARY OF THE INVENTION

The primary purpose of the present invention is to provide a bicycle handbrake assembly structure to overcome the foregoing shortcomings of the conventional handbrake. The present invention cuts a planar surface (or mills a slot) on the fitting tube welded to the bicycle frame. The planar surface (or a slot) is parallel to the brake pad's contact surface to the wheel rim. On the other hand, the present invention configures a protruding plate (or a protruding bar) on the adjusting seat along the adjusting seat's axial direction. When a brake arm is pin-joined to the fitting tube of the bicycle frame, the brake arm could be positioned quickly and easily by arranging the axial protruding plate of the adjusting seat to match against the planar surface of the fitting tube (or, the protruding bar of the adjusting seat to fit in the slot of the fitting tube).

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

In the following, detailed description along with the accompanied drawings is given to better explain preferred embodiments of the present invention. Please note that some parts of the accompanied drawings are not drawn to scale or are somewhat exaggerated. It should be understood that this is for illustrative purpose and is not intended to limit the presentation in any way.

Figure 1:
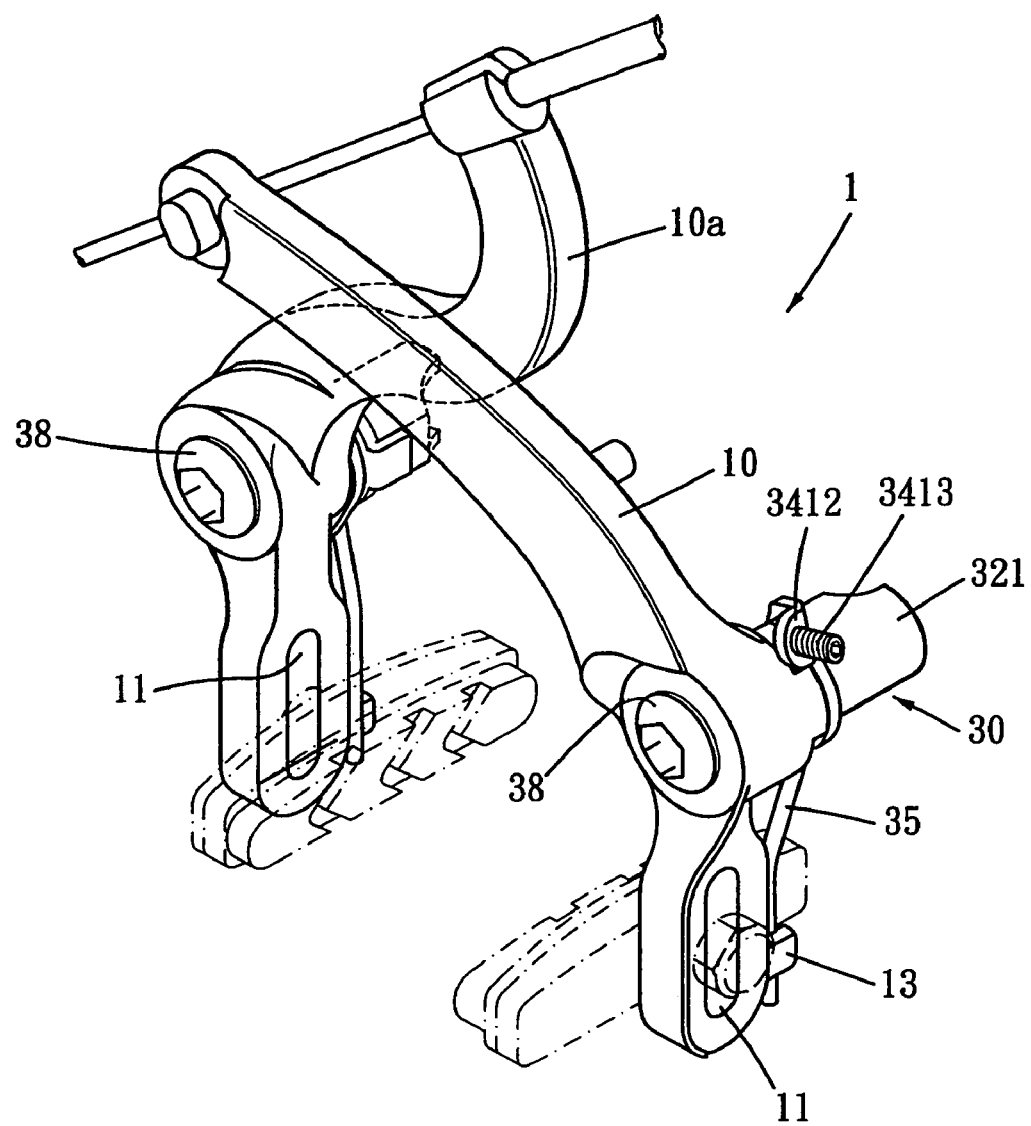
FIG. 1 is a perspective view of an assembled handbrake assembly according to a first embodiment of the present invention.

Please refer to FIG. 1, which is a perspective view of an assembled handbrake assembly according to a first embodiment of the present invention. As illustrated, the U-type handbrake assembly 1 contains a first brake arm 10 and a second brake arm 10a. Each of the two brake arms 10 and 10a has a slotted opening 11 through which a brake pad (not numbered) is fixed by a bolt 101. The two brake arms 10 and 10a are pin-joined respectively to a fitting tube 32 of the bicycle frame (not shown) by a bolt 38 screwed through a pin hole 12 and an adjusting member 30.

Figure 2:
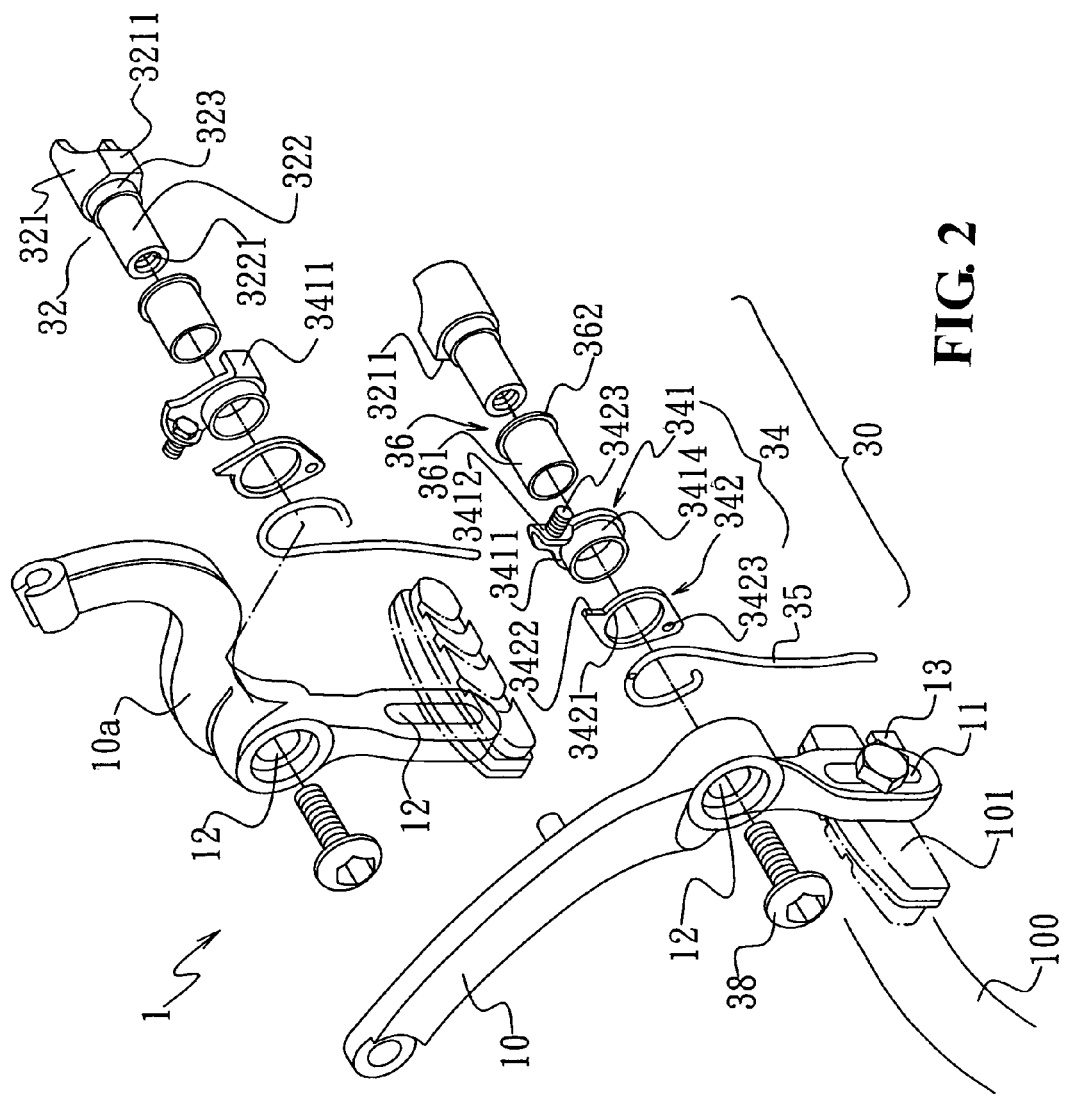
FIG. 2 is an explosion perspective view of a handbrake assembly according to a first embodiment of the present invention.
Figure 3:
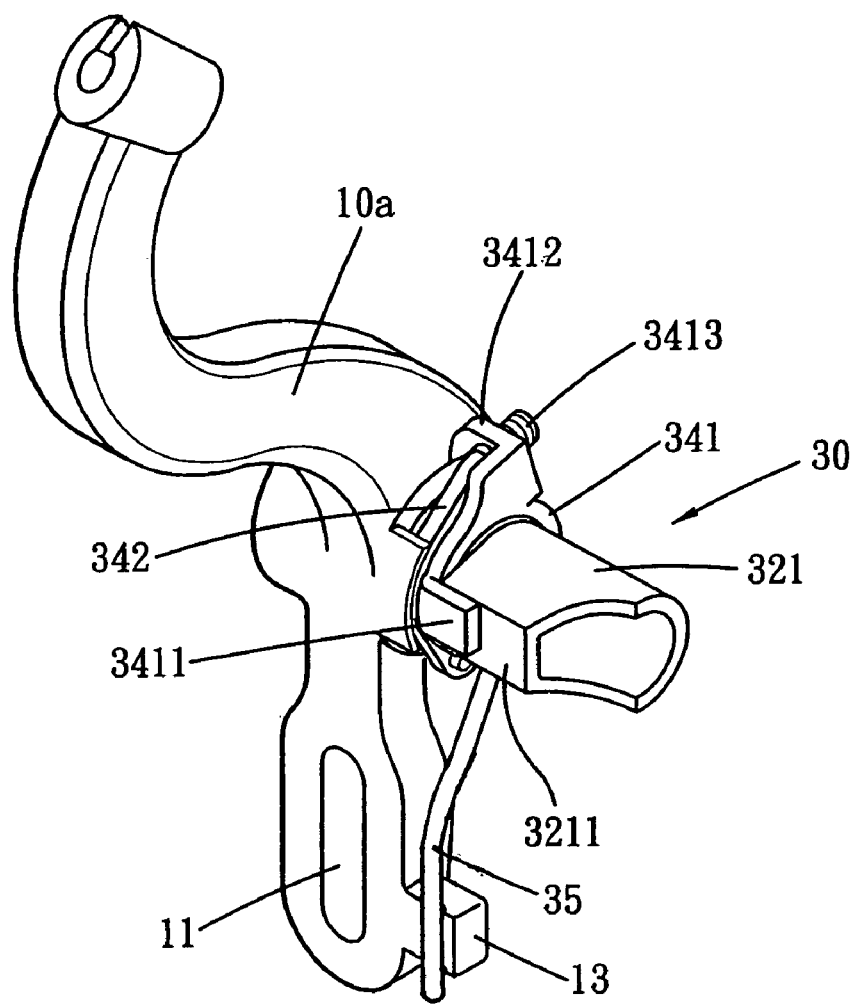
FIG. 3 is a perspective view showing an assembled brake arm according to a first embodiment of the present invention.

Please also refer to FIG. 2, which is an explosion perspective view of a handbrake assembly according to a first embodiment of the present invention. The fitting tube 32 contains a first tubular body 321, a second tubular body 322, and a third tubular body 323 interposed between the first and second tubular bodies 321 and 322. The fitting tube 32 is fixedly attached to the bicycle frame by welding the first tubular body 321, which has the largest diameter among the three tubular bodies 321, 322, and 323, to the bicycle frame. As illustrated in FIG. 1, the first tubular body 321 has a Ω shape for fitting the bicycle frame inside. The first tubular body 321 is configured to have a planar surface 3211 which is generally parallel to the contact surface (not numbered) of the brake pad. The adjusting member 30 has a portion with a diameter less than that of the first tubular body 321 but matching that of the third tubular body 323, which has the second largest diameter among the three tubular bodies 321, 322, and 323. When the adjusting member 30 and the fitting tube 32 are pin-joined together by the bolt 38, the adjusting member is therefore sleeved over the second tubular body 322 of the fitting tube 32, and a protruding plate 3411 of the adjusting member 30 matches perfectly against the planar surface 3211.

The adjusting member 30 contains an adjusting device 34, a return spring 35, a tube 36, and the bolt 38.

The adjusting device 34 is further composed of an adjusting seat 341 and an adjusting ring 342. The adjusting seat 341 has a protruding plate 3411 extended out at a side of the adjusting seat 341 for a pre-determined distance toward the planar surface 3211. Opposite to the protruding plate 3411, the adjusting seat 341 has an ear 3412 screwed with an adjusting screw 3413. The adjusting seat 341 further has a tubular body 3414 composed of two sections (not shown), one with a larger diameter and the other one a smaller diameter. When the adjusting member 30 is sleeved over the fitting tube 32, the larger section of the tubular body 3414 is fitted over the third tubular body 323 while the smaller section is over the second tubular body 322. In addition, the protruding plate 3411 is wedged against the planar surface 3211. By these arrangements, the adjusting seat 341 is fixedly positioned over the third tubular body 323 and cannot be rotated. On the other hand, the adjusting ring 342 is sleeved over the tube 3414 and can rotate freely around the tubular body 3414.

The adjusting ring 342 has a bulge 3422 standing up at the rim 3421 against the adjusting screw 3413 of the adjusting seat 341. The adjusting ring 342 has a hole 3423 at the bottom of the rim into which an end of the return spring 35 is inserted. The return spring 35 then goes around the adjusting ring 342 and extends downward to have the other end positioned against a protruding rod 13 besides the slotted ring 11. By screwing in the adjusting screw 3413, the adjusting ring 342 is rotated which in turn leads to the return spring 35 to push the protruding rod 13, causing the brake pad to be farther away from the rim 100 of the wheel. On the other hand, by screwing out the adjusting screw 3413, the adjusting ring 342 is rotated for a smaller angle which in turn leads to the return spring 35 to exert less force on the protruding rod 13, causing the brake pad to be closer to the rim of the wheel. In other words, the adjusting screw 3413 could adjust the distance between the brake pad and the rim of the wheel.

The tube 36 has a tubular body 361 having a predetermined length and a flange 362 having a diameter equal or slightly larger than the diameter of the tubular body 3414's smaller section. The tubular body 361 is fitted inside the pin hole 12 and is sleeved over the second tubular body 322 of the fitting tube 32. The assembly of the handbrake is completed by screwing two bolts 38 to pass through the pin holes 12 of the brake arms 10 and 10a, the tubular bodies 361, and into the bolt holes 3221 of the second tubular bodies 322.

As illustrated in FIG. 2, during assembly, the planar surface 3211 of the fitting tube 32 should be adjusted to be parallel to the brake pad and face the same direction as the brake pad. The fitting tube 32 is then welded to the bicycle frame. Subsequently, the adjusting ring 342 having the return spring 35 installed is sleeved over the tubular body 3414 of the adjusting seat 341 to complete the assembly of the adjust device 34. The tubular body 361 is then inserted through the adjust device 34 into the pin hole 12. The tubular body 361 fits closely inside the smaller section of the tubular body 3414 of the adjusting seat 341.

The brake arm having the assembly member 30 attached is then sleeved over the second tubular body 322 of the fitting tube 32. The larger section of the tubular body 3414 of the adjusting seat 341 is fitted over the third tubular body 323 of the fitting tube 32. By matching the protruding plate 3411 of the adjusting seat 341 against the planar surface 3211 of the fitting tube 32, the brake arm would easily reach its predetermined position.

At last, the bolt 38 is screwed through the pin hole 12, the tube 36, and into the bolt hole 3221 of the second tubular body 322 of the fitting tube 32. The two brake arms 10 and 10a are then in their corresponding symmetrical positions.

From the foregoing description, it could be seen that the matching of the protruding plate 3411 of the adjusting seat 341 against the planar surface 3211 of the fitting tube 32 welded to the bicycle frame is the key to quick and precise positioning of the brake arms 10 and 10a. This very simple and economical approach could greatly enhance the assembly performance of a bicycle handbrake.

Figure 4:
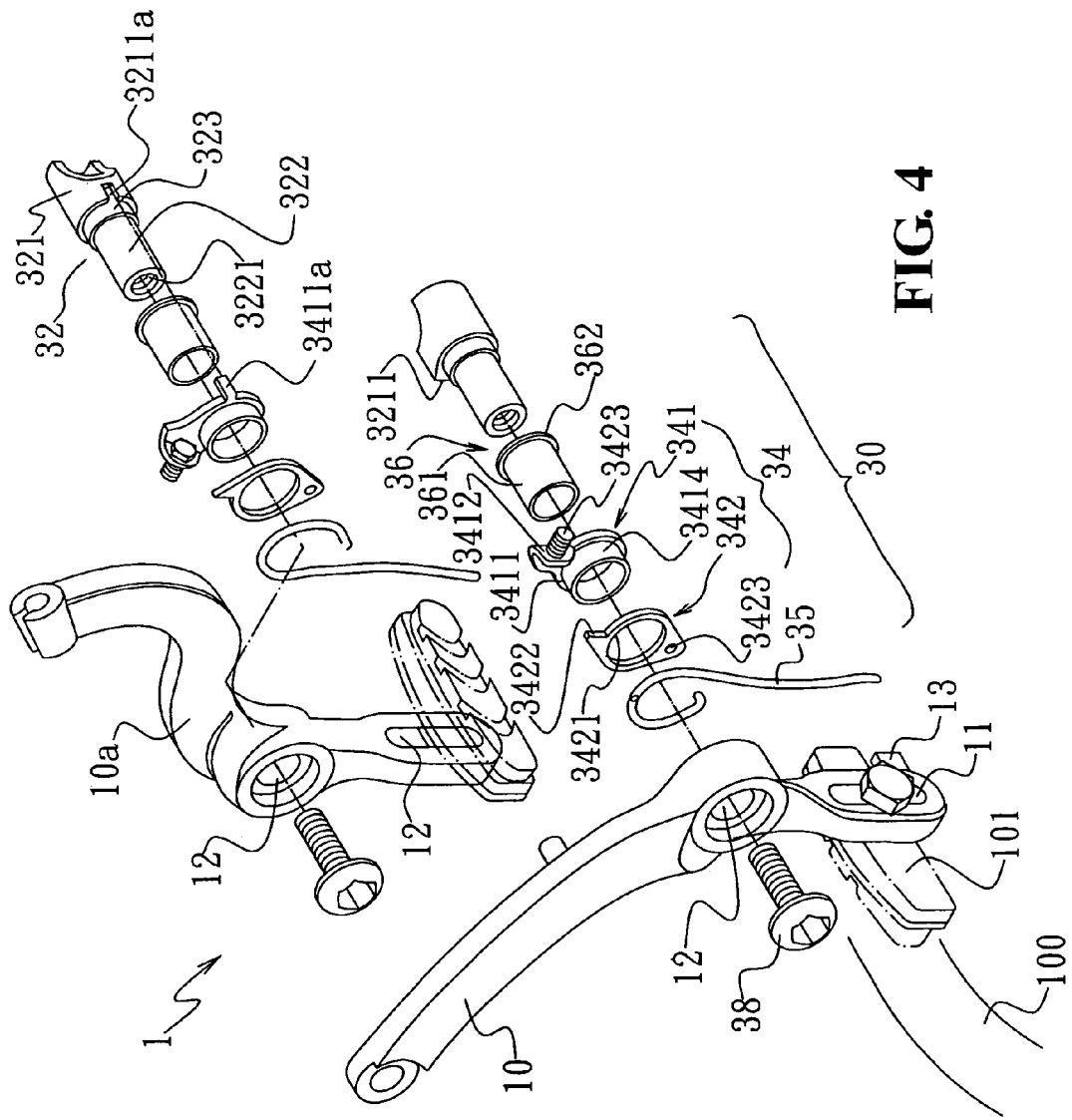
FIG. 4 is a perspective view of an assembled handbrake assembly according to a second embodiment of the present invention.

FIG. 4 is a perspective view of an assembled handbrake assembly according to a second embodiment of the present invention. The structure of the second embodiment is very similar to the first embodiment and identical parts are named and numbered identically. The description below is focused on the differences only.

Figure 5:
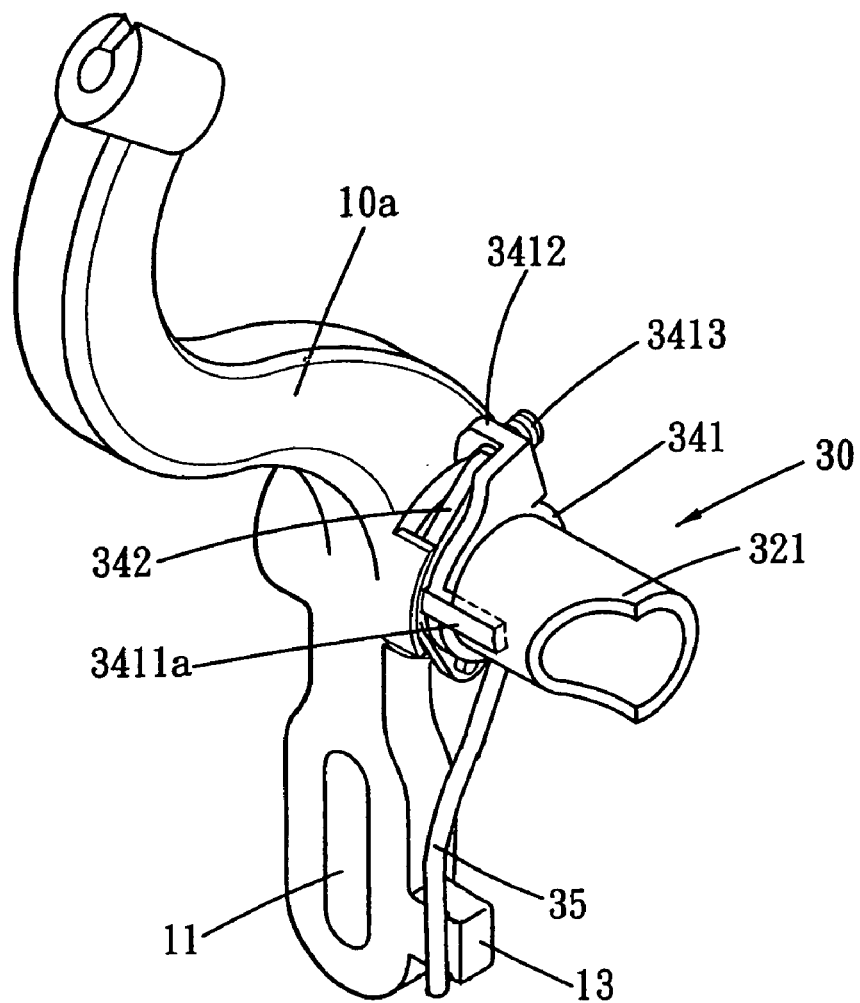
FIG. 5 is an explosion perspective view of a handbrake assembly according to a second embodiment of the present invention.
Figure 6:
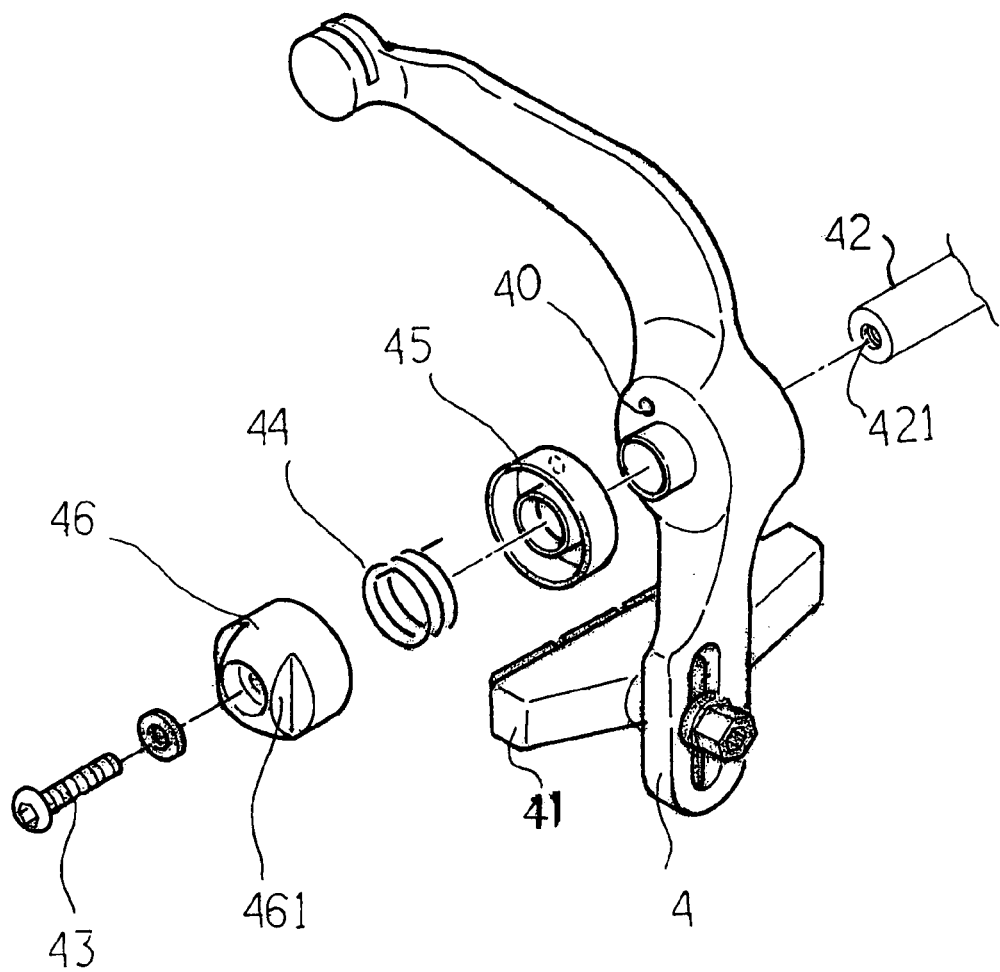
FIG. 6 is an explosion perspective view of a brake arm of a conventional U-type handbrake.

The protruding plate 3411 used in the previous embodiment is changed into a protruding bar 3411a having a smaller surface area. The protruding bar 3411 could be a cylinder or a prism. On the other hand, in order to accommodate the protruding bar 3411a, the first tubular body 321 of the fitting tube 32, instead of having a planar surface 3211 as in the previous embodiment, has a corresponding slot (3211a) whose shape and dimension matching those of the protruding bar 3411a. As illustrated in FIG. 5, when the adjusting seat 341 is sleeved over the third tubular body 323 of the fitting tube 32, the brake arm would be quickly positioned in an appropriate position by having its protruding bar 3411a lodged in the slot 3211a.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A U-type handbrake assembly structure comprising a first and a second brake arms each having a slotted opening through which a brake pad is fixed, said first and second brake arms being pin-joined to a fitting tube by a bolt screwed through a pin hole and an adjusting member, said fitting tube including a first tubular body, a second tubular body and a third tubular body interposed between said first said third tubular body in diameter, said third tubular body being larger than said second tubular body in diameter, said first tubular being configured to have a planar surface which is parallel to a contact surface of said brake pad, said adjusting member having a portion with a diameter being smaller than said first tubular body in diameter and being equal to said third tubular body in diameter, said portion of said adjusting member being sleeved over said second tubular body when said adjusting member and said fitting tube are pin-joined together by said bolt, said adjusting member including an adjusting device, a return spring, an adjusting member tube and said bolt, said adjusting device being composed of an adjusting seat and adjusting ring, said adjusting seat having a protruding plate extended out at a side of said adjusting seat for a predetermined distance toward said planar surface, said adjusting seat having an ear screwed with an adjusting screw and having an adjusting seat tubular body said protruding plate being wedged against said planar surface, said adjusting seat being fixedly positioned over said third tubular body and being unable to rotate, said adjusting ring being sleeved over said adjusting tubular body and able to rotate freely around said adjusting seat tubular body, said adjusting ring having a bulge standing up at a ring rim against said adjusting screw, said adjusting ring having a hole at a bottom of said ring rim in which an end of said return spring is inserted, said return spring going around said adjusting ring and extending downward to have an end positioned against a protruding rod beside said slotted opening, said adjusting ring being rotated by screwing in said adjusting screw which in turn leads to said return spring to push said protruding rod, causing said brake pad to be farther away from a wheel rim, said adjusting ring being rotated for a smaller angle by screwing out said adjusting screw which in turn leads to said return spring to exert less force on said protruding rod causing said brake pad to be closer to said wheel rim, adjusting member tube having a tubular portion being fitted inside said pin hole, inserted through said adjusting device, and being sleeved over said second tubular body, wherein in an assembled state, said bolt passes through said tubular portion and into a bolt hole of said second tubular body.

* * * * *